(12) United States Patent
Gatz et al.

(10) Patent No.: US 10,457,487 B2
(45) Date of Patent: Oct. 29, 2019

(54) SORTING CONVEYOR AND BELT

(71) Applicant: Laitram, L.L.C., Harahan, LA (US)

(72) Inventors: Christopher J. Gatz, Jeffersonville, IN (US); Mark Costanzo, River Ridge, LA (US); David Herbert Myers, River Ridge, LA (US); Sean Edward Stephens, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/768,787

(22) PCT Filed: Oct. 27, 2016

(86) PCT No.: PCT/US2016/059019
§ 371 (c)(1),
(2) Date: Apr. 16, 2018

(87) PCT Pub. No.: WO2017/083109
PCT Pub. Date: May 18, 2017

(65) Prior Publication Data
US 2019/0202638 A1    Jul. 4, 2019

Related U.S. Application Data

(60) Provisional application No. 62/255,127, filed on Nov. 13, 2015.

(51) Int. Cl.
*B65G 17/34*    (2006.01)
*B65G 47/96*    (2006.01)

(52) U.S. Cl.
CPC .............. *B65G 17/34* (2013.01); *B65G 47/96* (2013.01)

(58) Field of Classification Search
CPC ........ B65G 17/16; B65G 17/34; B65G 47/38; B65G 47/96; B65G 47/962; B65G 47/965; B65G 47/967
USPC .......................... 198/370.03, 370.04, 370.05
See application file for complete search history.

(56) References Cited

U.S. PATENT DOCUMENTS

| 4,624,362 A | | 11/1986 | Temme et al. | |
|---|---|---|---|---|
| 5,086,929 A | * | 2/1992 | Richter ................... | B07C 3/082 198/370.04 |
| 5,435,429 A | | 7/1995 | Van Den Goor | |
| 5,641,072 A | * | 6/1997 | Otake ....................... | B07C 5/10 198/396 |

(Continued)

FOREIGN PATENT DOCUMENTS

| EP | 0391575 A1 | 10/1990 |
|---|---|---|
| EP | 0671349 A1 | 9/1995 |

(Continued)

OTHER PUBLICATIONS

Extended European Search Report, European Application No. 16864770.9, dated May 22, 2019, European Patent Office, Munich, Germany.

*Primary Examiner* — William R Harp
(74) *Attorney, Agent, or Firm* — James T. Cronvich

(57) ABSTRACT

A sorting conveyor comprising a modular conveyor belt having a plurality of carriers along its length. Each carrier comprises an opening through the belt associated with one or more doors movable between a closed position occluding the opening and supporting a load and an open position not occluding the opening to drop the load at a selected drop position.

34 Claims, 21 Drawing Sheets

(56) References Cited

U.S. PATENT DOCUMENTS

| | | | |
|---|---|---|---|
| 5,842,556 A | 12/1998 | van Hattum | |
| 6,708,816 B2 | 3/2004 | Schindler | |
| 7,506,750 B2 | 3/2009 | Costanzo et al. | |
| 7,604,448 B2 | 10/2009 | Balk et al. | |
| 8,939,280 B2 | 1/2015 | Bogle et al. | |
| 9,962,743 B2 * | 5/2018 | Bombaugh | B07C 5/36 |
| 10,065,807 B1 * | 9/2018 | Garrett | B07C 5/36 |
| 2007/0023257 A1 | 2/2007 | Schiesser | |
| 2017/0197233 A1 | 7/2017 | Bombaugh et al. | |
| 2018/0319606 A1 * | 11/2018 | Rieu | B65G 47/78 |

FOREIGN PATENT DOCUMENTS

| | | |
|---|---|---|
| EP | 0742165 A1 | 11/1996 |
| WO | 2014008135 A1 | 1/2014 |

* cited by examiner

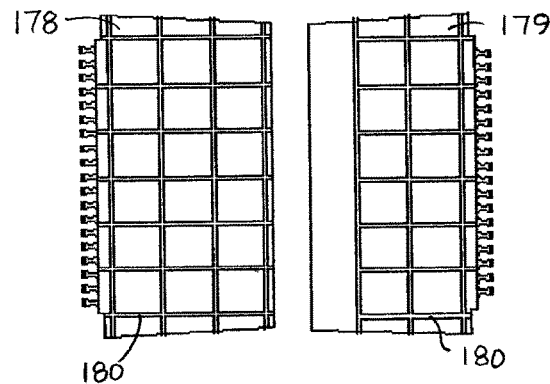
FIG. 15
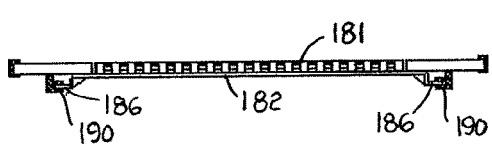
FIG. 16A
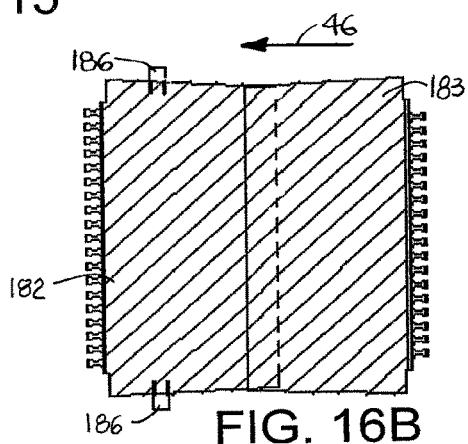
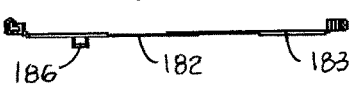
FIG. 16B
FIG. 16C
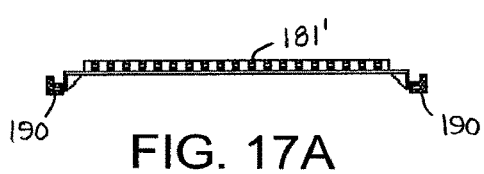
FIG. 17A
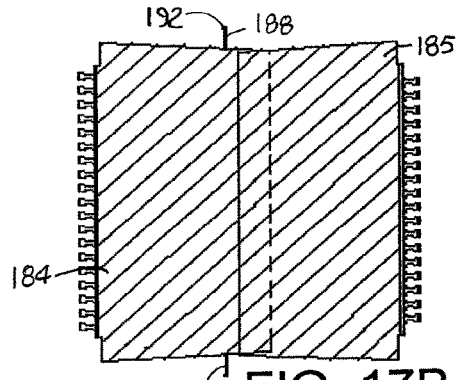
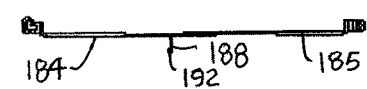
FIG. 17B
FIG. 17C

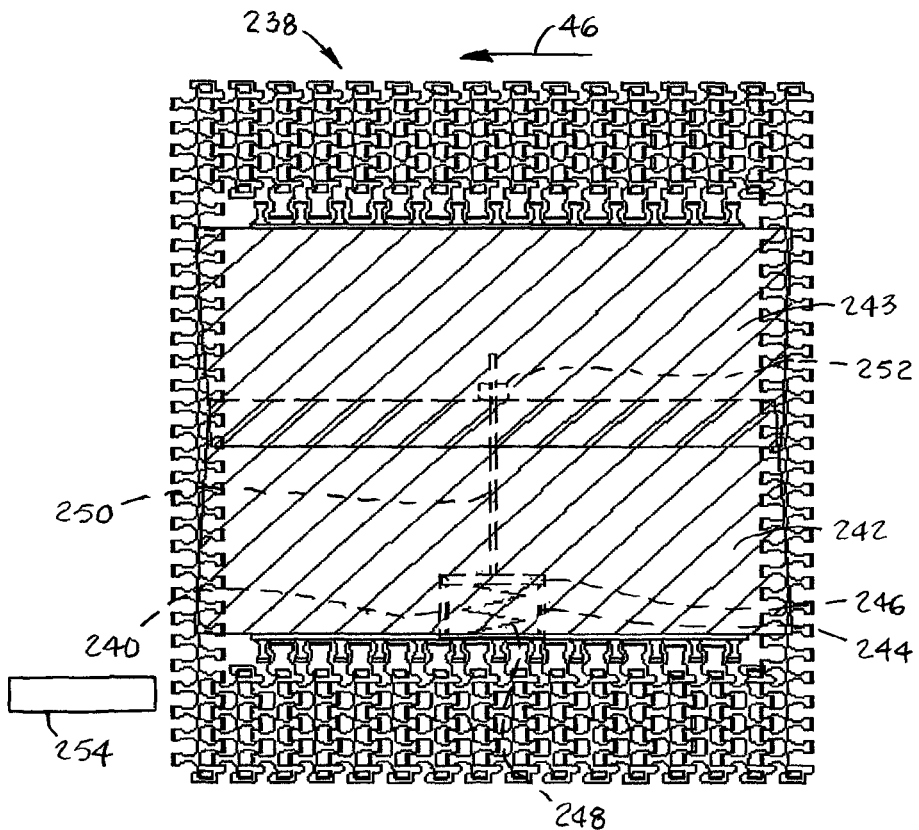
FIG. 26A
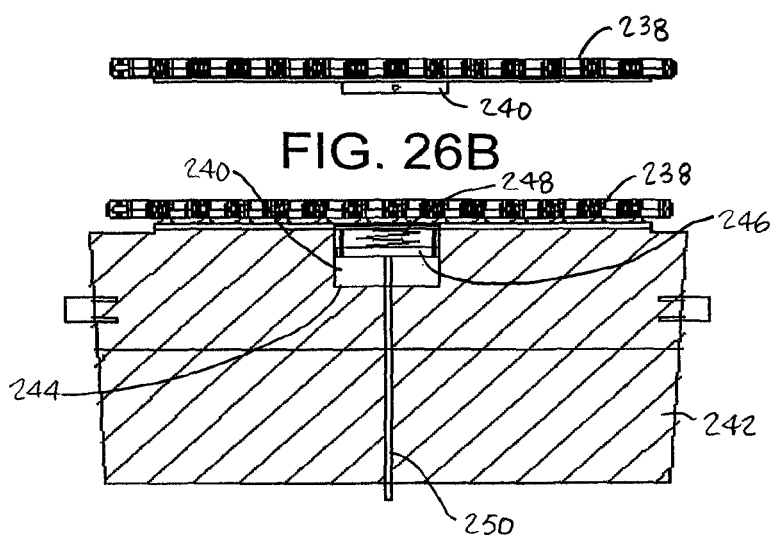
FIG. 26B
FIG. 26C

SORTING CONVEYOR AND BELT

BACKGROUND

The invention relates generally to power-driven conveyors and more particularly to sorting belt conveyors that convey articles on carriers that individually release to drop articles from the conveyor at selected drop locations.

Flat sorters, such as tilt-tray sorters, cross-belt sorters, and bomb-bay sorters, are used to sort articles to cartons, totes, sacks, chutes, or discharge conveyors below the sorter. Flat sorters conventionally comprise a series of metal carriers arranged end to end to form a conveyor loop that follows a racetrack path in a horizontal plane. Articles are inducted onto individual carriers. When a carrier reaches the destination point of the article it is carrying, the carrier tilts, conveys, or otherwise releases to sort the article to its destination.

In many plants, especially on long sorter runs, it is convenient for the sorter to incline or decline over or under aisles or other facility interferences. Because the individual carriers of conventional bomb-bay sorters are made of rigid metal, they are not amenable to making the transition from a horizontal plane to an incline or a decline. Nor are conventional bomb-bay sorters easily adapted to make both left and right turns to follow a horizontal path that can snake through a plant.

SUMMARY

One version of a conveyor belt embodying features of the invention comprises an endless belt body having a top and an opposite bottom extending laterally from a first side to a second side and longitudinally in a direction of belt travel. The belt body includes a plurality of openings extending through the belt body from the top to the bottom. The openings are indented laterally inward of the first and second sides and are spaced apart longitudinally. Doors associated with the plurality of openings are movably attached to the belt body for movement from first positions occluding the openings to support articles in the openings to second positions away from the openings to release articles through the openings.

In another aspect, one version of a conveyor embodying features of the invention comprises a conveyor frame, an endless conveyor belt, such as the one described in the preceding paragraph, supported in the frame, and a drive system driving the conveyor belt in a direction of belt travel.

BRIEF DESCRIPTION OF THE DRAWINGS

FIG. 15 is a bottom view of a pair of doors usable in a carrier section as in FIG. 4A with reinforcing ribs.

FIG. 16A is a cross-sectional view of one version of a sorter as in FIG. 1 with tab-receiving slots; FIGS. 16B and 16C are top plan and side elevation views of the doors of a two-door carrier section with tabs on the leading door.

FIG. 17A is a cross-sectional view of another version of a sorter as in FIG. 1 with cam-roller-receiving slots; FIGS. 17B and 17C are top plan and side elevation views of the doors of a two-door carrier section with cam-roller followers on the leading door.

FIGS. 26A, 26B, and 26C are top plan, side elevation, and front elevation views of a two-door carrier section as in FIG. 4A with a spring-return latch.

DETAILED DESCRIPTION

Figure 1:
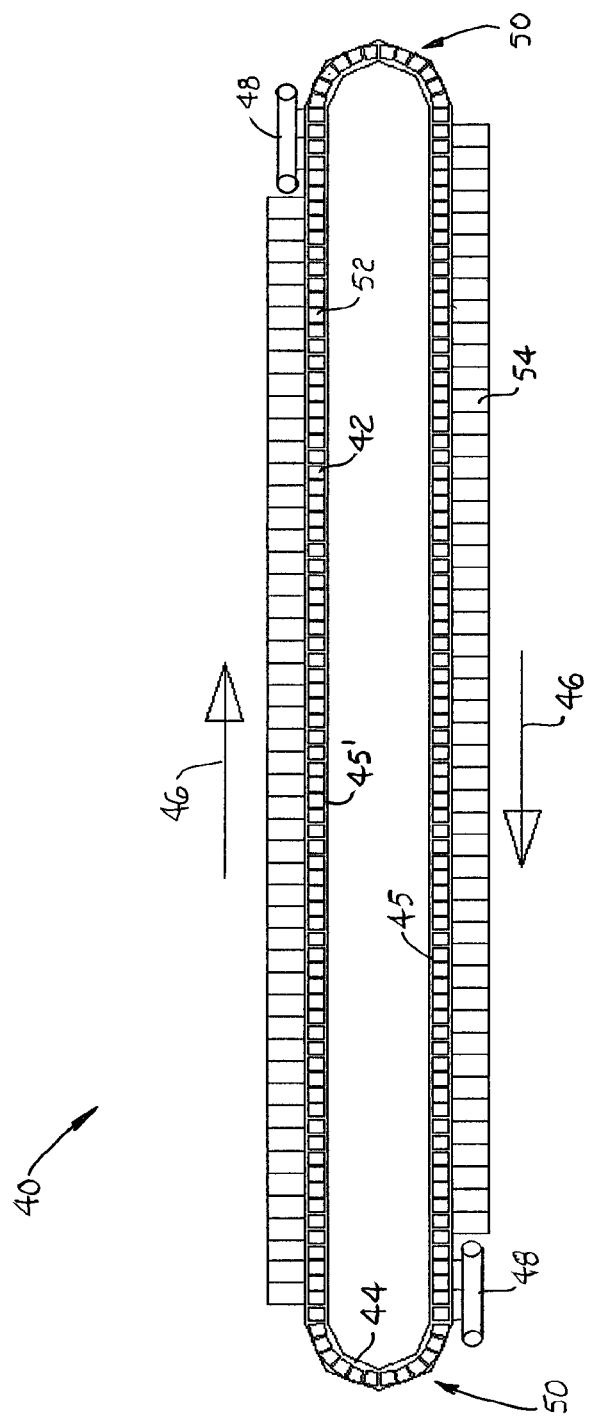
FIG. 1 is a top plan view of one version of a sorting conveyor embodying features of the invention.

FIG. 1 shows a sorting conveyor, or sorter, embodying features of the invention. The sorter 40 comprises a conveyor belt 42 supported in a conveyor frame 44 in a racetrack, or oval, configuration forming a loop with two straight sections 45, 45' joined by two turns 50. The conveyor belt 42 is driven in a direction of belt travel 46 by a drive 48, shown in this example as a pair of synchronized intermediate drive belts engaging the outside edges of the conveyor belt as it enters the turns 50 of the conveyor 40. Other drives are possible. For example, a large horizontal drive sprocket engaging the edge of the belt 42 at the inside of one of the turns and an idle sprocket at the other could be used instead. Carriers 52 are spaced apart longitudinally along the length of the conveyor belt 42 in the direction of belt travel 46. Articles are inducted manually, automatically, robotically, or by conveyor (not shown) into the carriers 52. Articles are sorted off the advancing belt 42 to one of a number of drops 54 disposed below the belt. The drops 54 may be cartons, totes, sacks, chutes, conveyors, or the like. When an article destined for a certain drop reaches that drop, the carrier releases the article it is supporting to fall onto the drop below. Sensors and control systems for controlling sorters are well known and can be used in the sorter 40 to control the sorting process.

Figure 2:
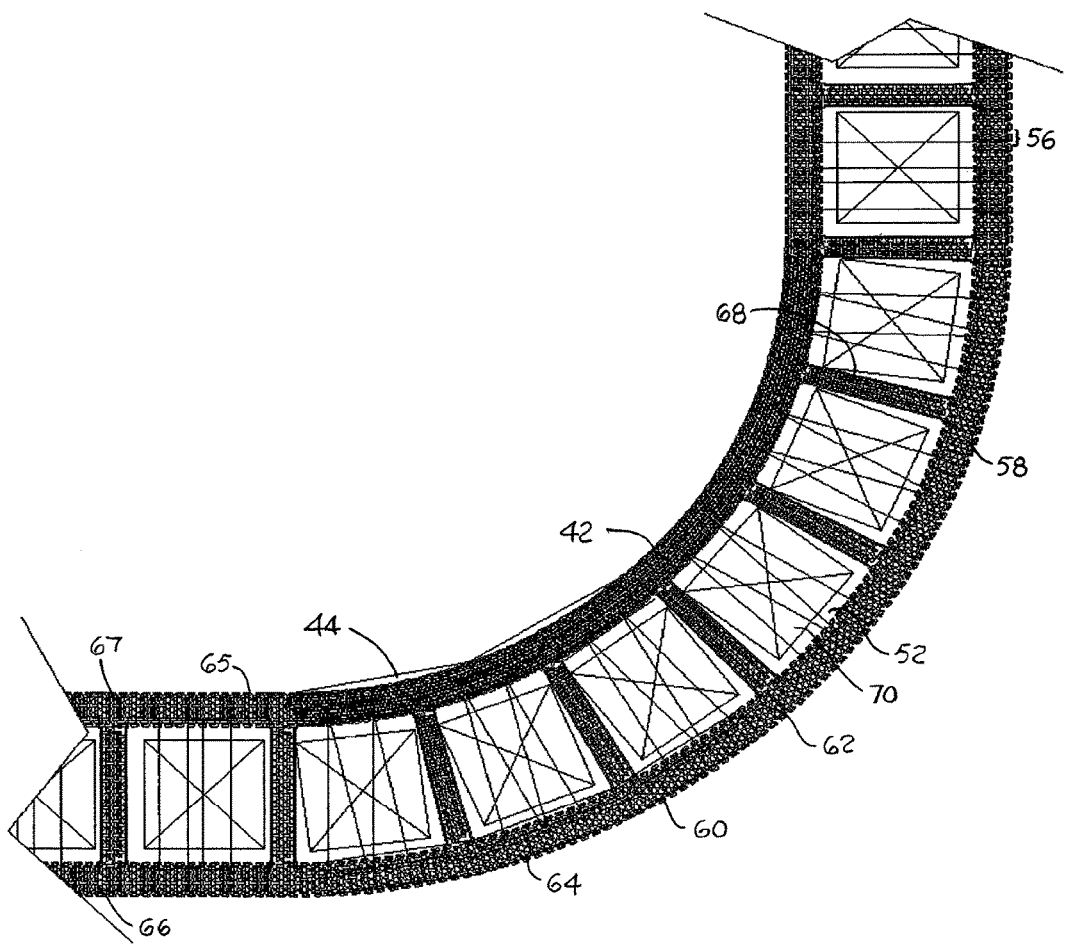
FIG. 2 is a top plan view of a portion of a conveyor belt usable in a sorting conveyor as in FIG. 1.

As shown in FIG. 2, the conveyor belt 42 supported in the frame 44 is constructed of a series of rows 56 of belt modules 58 linked together at hinge joints 60 extending laterally across the width of the belt in a horizontal plane. The belt 42 can articulate up and down at the hinge joints 60. The joined belt rows 56 form an endless belt body 62. The carriers 52 are formed in the belt body 62 regularly spaced from each other in the longitudinal direction of the belt 42. The carriers 52 are also indented in from laterally opposite sides 64, 65 of the belt body. The indented carriers 52 leave indented longitudinal lanes 66, 67 that form outer portions of the endless belt body 62. The carriers 52 are separated by intermediate rows 68 of belt modules that extend laterally across the entire width of the belt 42 with the indented lanes 66, 67 included. The pitch of the belt, i.e., the longitudinal distance between consecutive hinge joints 60, is less than the longitudinal dimension of the carriers 52. Each carrier 52 can support one or more articles 70 destined for the same drop.

Figure 3A:
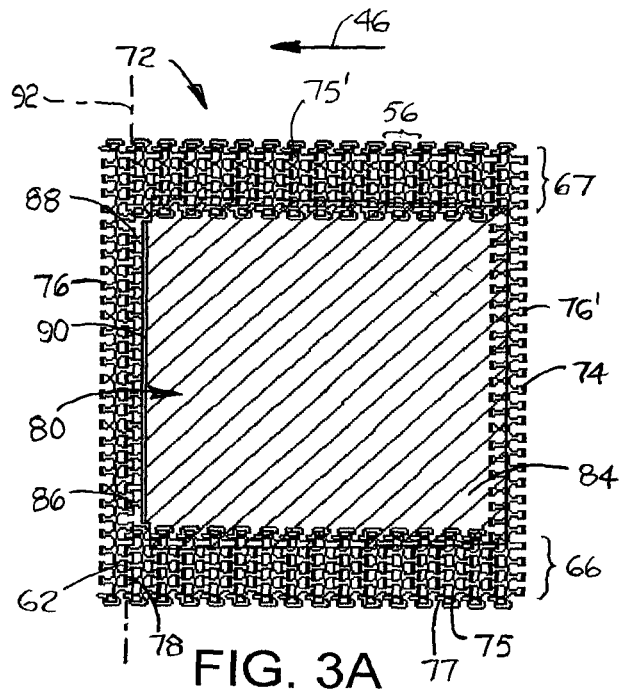
FIG. 3A is a top plan view of a single-door carrier section of a conveyor belt for a sorter as in FIG. 1.
Figure 3B:
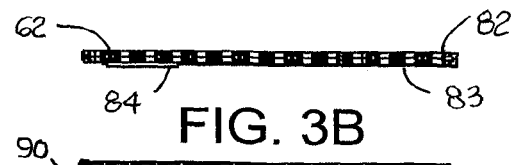
FIGS. 3B and 3C are side elevation views of the single-door carrier section in closed and open positions.
Figure 3C:
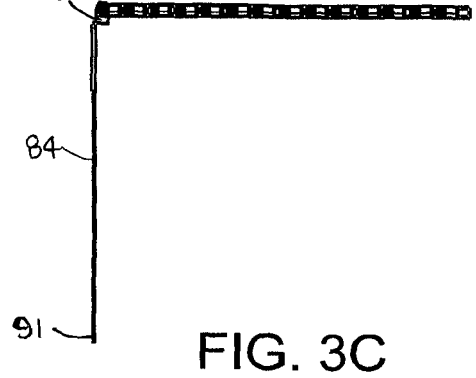
Figure 35:
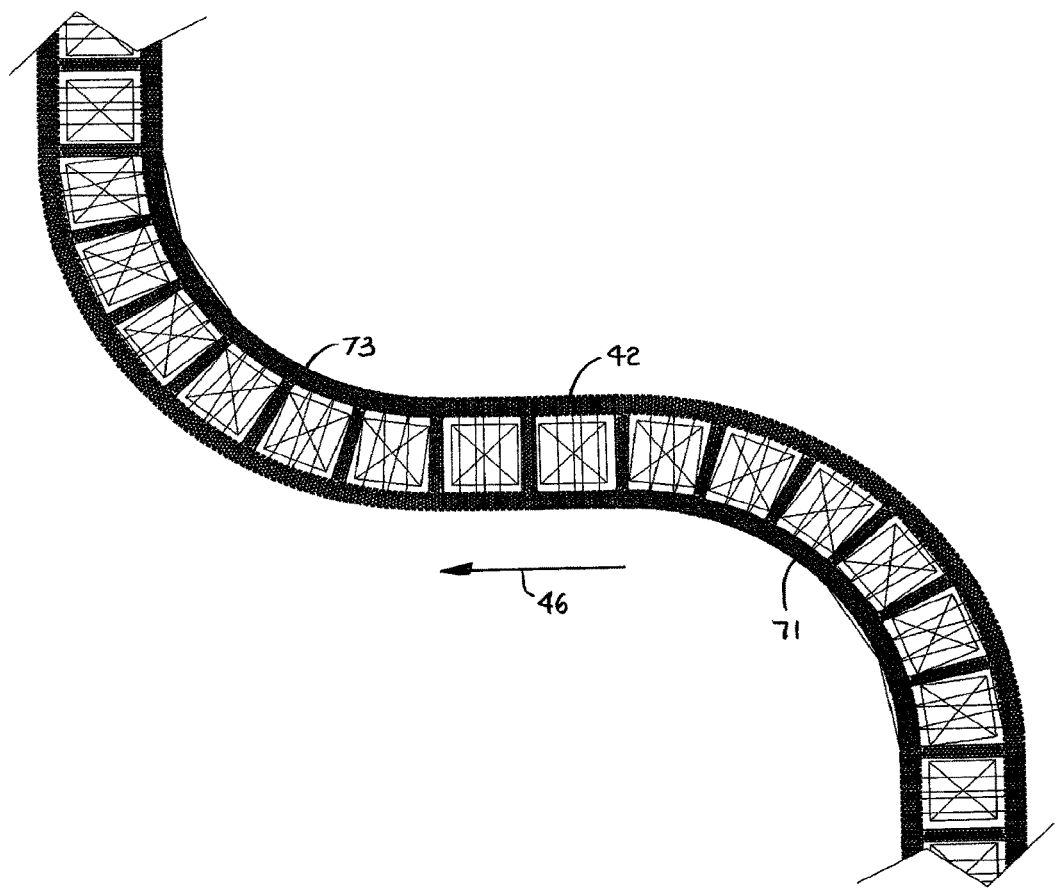
FIG. 35 is a top plan view of a portion of a conveyor belt as in FIG. 2 negotiating left and right turns.

One version of a carrier section 72 of a conveyor belt 42 for use in a sorter as in FIG. 1 is shown in FIGS. 3A-3B. The carrier section 72 is constructed of a series of rows 56 of belt modules, including wide modules 74 and shorter left and right edge modules 75, 75'. The edge modules 75, 75' form parts of the indented longitudinal lanes 66, 67 of the belt body 62. The longer modules 74, which may be made of a number of side-by-side smaller modules, extend laterally across the entire width of the belt body 62 to form the intermediate rows 68 and the remaining portions of the longitudinal lanes 66, 67. The rows 56 of belt modules have laterally spaced fingers 76, 76' that extend longitudinally outward from the leading and trailing ends of the rows. The fingers 76 along the leading end of a row are interdigitated with the fingers 76' along the trailing end of a leading row. Holes in the interdigitated fingers 76, 76' are aligned to form a lateral passageway for a hinge rod 77 that links consecutive modules together at a hinge joint 78. The belt rows 56 can articulate about the lateral hinge axis formed by the hinge joint 78. The holes in one or the other set of fingers 76, 76' can be elongated in the direction of belt travel 46 to allow the belt 42 to flex sidewise and follow left 71 or right 73 turns by collapsing at the inside of the turn as in FIG. 35. The short belt modules 75, 75' and the long belt modules 74 shown in FIG. 2 bound a rectangular opening 80 that extends through the thickness of the module body 62 from a top side 82 to a bottom side 83. The longitudinal extent of the opening 80 exceeds the pitch of the modular conveyor belt 42. A single door 84 is hingedly attached to the fingers 76 of the long module 74 bounding the opening 80 by a hinge pin 86. Fingers 88 at a hinge end 90 of the door 84 interdigitate with the fingers 76 of the long module 74. A distal end 91 of the door 84, when closed as in FIG. 3B, rests against the bottom 83 of the belt body 62. In the closed position the door 84 occludes the opening 84 and forms a floor below the bottom side 83 to support conveyed articles. The belt modules 74, 75, 75' bounding the opening 80 form a lip that helps confine articles in the opening. The door 84 releases by pivoting downward about a lateral axis 92 defined by the hinge pin 86, as shown in FIG. 3C. When the door 84 releases, articles that were supported on the closed door drop through the non-occluded opening 80 and onto the drop below.

Figure 4A:
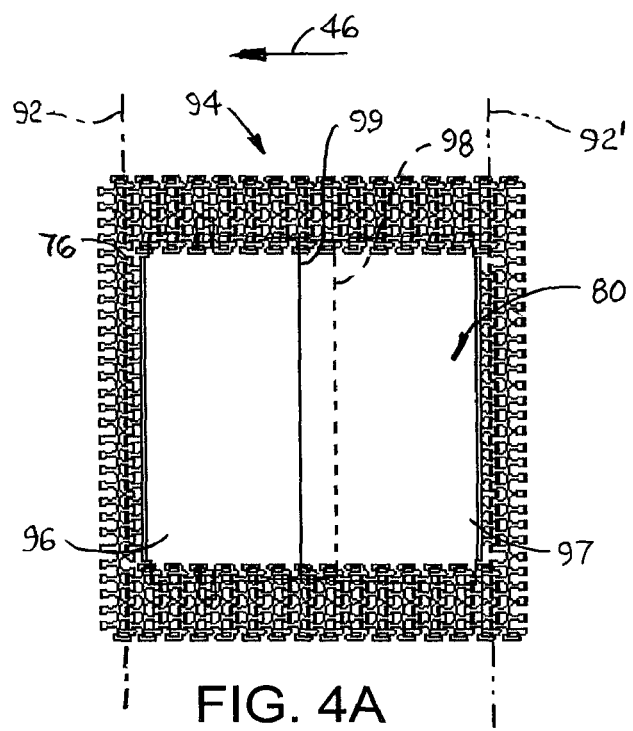
FIG. 4A is a top plan view of a two-door carrier section for a sorter as in FIG. 1.
Figure 4B:
FIGS. 4B and 4C are side elevation views of the two-door carrier section in closed and open positions.
Figure 4C:
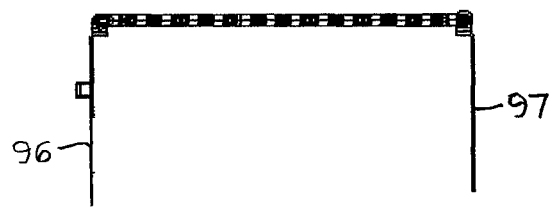

A two-door carrier section 94 is shown in FIGS. 4A-4C. In this version a leading door 96, like the single door of FIG. 3A, is attached by a hinge pin to the fingers 76 of the long module 74 bounding the opening. A trailing door 97 is similarly hingedly attached on the other side of the opening

80 along a lateral hinge axis 92'. Distal ends 98, 99 of the leading and trailing doors 96, 97 overlap vertically when the doors are in their closed position to form a support floor for conveyed articles. When an article reaches its designated drop, the doors 96, 97 open by pivoting 90° about their lateral hinge axes 92 to release the article, as in FIG. 4C.

Figure 5A:
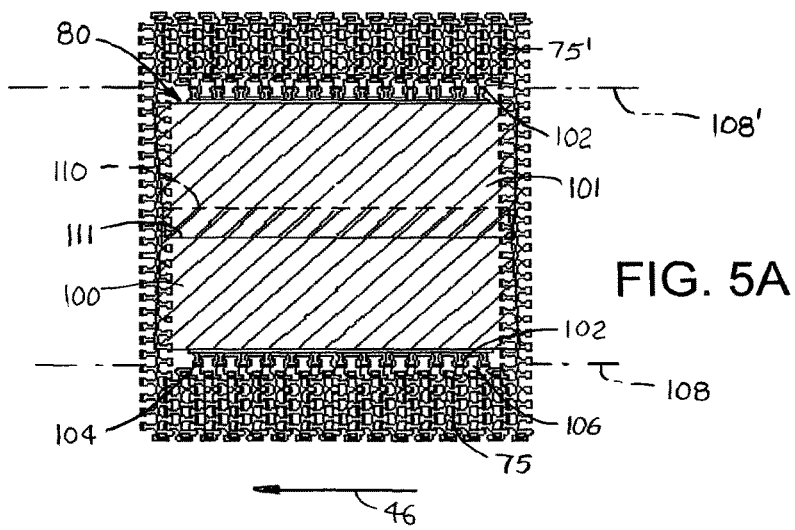
FIG. 5A is a top plan view of another version of a two-door carrier section for a sorter as in FIG. 1, but with doors that pivot open along an axis parallel to the direction of belt travel.
Figure 5B:
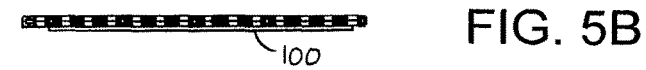
FIGS. 5B and 5C are side elevation views of the carrier section in closed and open positions.
Figure 5C:
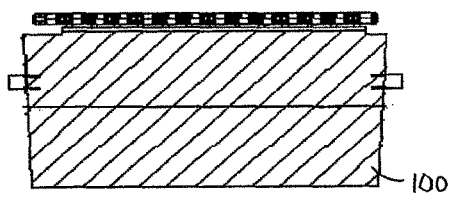

Another version of a two-door carrier is shown in FIGS. 5A-5C. In this version doors 100, 101 are attached at hinge joints 102 that extend longitudinally in the direction of belt travel 46. The hinge joints 102 are formed by fingers 104 on hinge ends of the doors 100, 101 interdigitated with fingers 106 on the inner edges of the edge modules 75, 75' bounding the edge of the opening 80. The interdigitated fingers 104, 106 are joined by hinge pins that allow the doors 100, 101 to pivot about longitudinal hinge axes 108, 108' between closed (FIG. 5B) and open (FIG. 5C) positions. In this example the distal ends 110, 111 of the doors 100, 101 overlap vertically when they are closed.

Figure 6A:
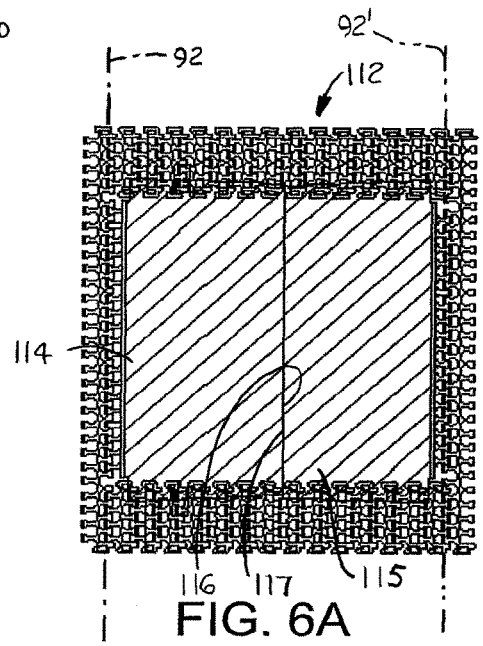
FIG. 6A is a top plan view of another two-door carrier section as in FIG. 4A, in which the two doors do not overlap.
Figure 6B:
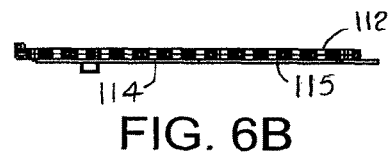
FIG. 6B is a side elevation view of the carrier section in the closed position.

A two-door carrier section 112 with non-overlapping doors 114, 115 is shown in the closed position in FIGS. 6A and 6B. Distal ends 116, 117 of the doors 114, 115 abut each other when the doors are closed. In this example the hinge axes 92, 92' of the doors are laterally disposed, perpendicular to the direction of belt travel 46, as in the two-door carrier 72 of FIG. 4A.

Figure 7:
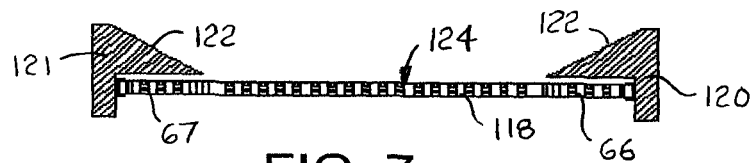
FIG. 7 is a cross section of a portion of the conveyor of FIG. 1 illustrating conveyor sideguards with angled upper surfaces.
Figure 8:
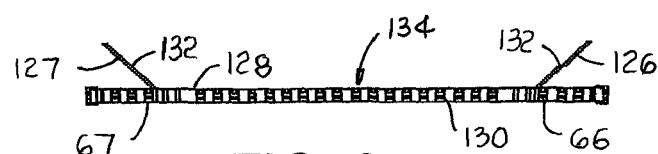
FIG. 8 is a front elevation view of a carrier section of a conveyor belt as in FIG. 2 with oblique sideguards.

One way to direct articles inducted onto a sorting belt 118 into the carriers is shown in FIG. 7. Sideguards 120, 121 mounted on the supporting conveyor frame along the outer sides of the belt 118 have upper surfaces 122 that extend over the tops of the indented longitudinal belt lanes 66, 67. The upper surfaces 122 angle downward toward the center of the belt 118 to guide articles toward the central carriers 124. Another way to guide articles into the carriers is shown in FIG. 8. In this version longitudinally extending sideguards, or flights 126, 127, stand upward from the top side 128 of a belt 130 in the indented longitudinal lanes 66, 67. The flights 126, 127 have faces 132 that are oblique to the top side 128 of the belt 130 to guide articles into the carriers 134.

Figure 9:
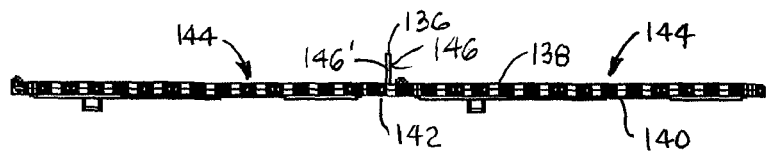
FIG. 9 is a side elevation view of two carrier sections as in FIG. 4A separated by a vertical flight.
Figure 10:
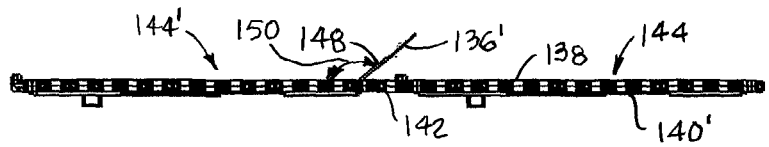
FIG. 10 is a side elevation view of two carrier sections as in FIG. 4A separated by an oblique flight.
Figure 11:
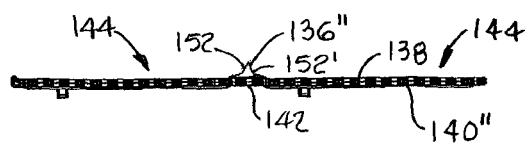
FIG. 11 is a side elevation view of two carrier sections as in FIG. 4A separated by a flight with sloping leading and trailing faces.
Figure 12:
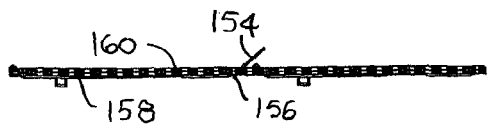
FIG. 12 is a side elevation view of two carrier sections as in FIG. 4A separated by a flight attached to an end of one of the carrier doors.

Laterally extending flights 136, 136', 136" stand up from the top sides 138 of the belts 140, 140', 140" in FIGS. 9-11. The flights 136, 136', 136" extend upward from the intermediate rows 142 of the belts between consecutive carrier sections 144. The flights 136, 136', 136" extend laterally across the width of the belts to form a barrier between consecutive carrier sections 144. The flight 136 in FIG. 9 is a straight flight with faces 146, 146' perpendicular to the top 138 of the belt 140. The flight 136' in FIG. 10 has oblique faces. The leading face 148 is oblique, forming an obtuse angle 150 with the top 138 of the belt 140' to help guide articles into a leading carrier 144'. The flight 136" in FIG. 11 has front and rear sloping faces 152, 152' to help guide articles into the leading carrier or the trailing carrier. FIG. 12 shows an oblique flight 154 as in FIG. 10, but attached to a distal end 156 of a hinged carrier door 158 instead of to the top of the belt body 160.

Figure 13A:
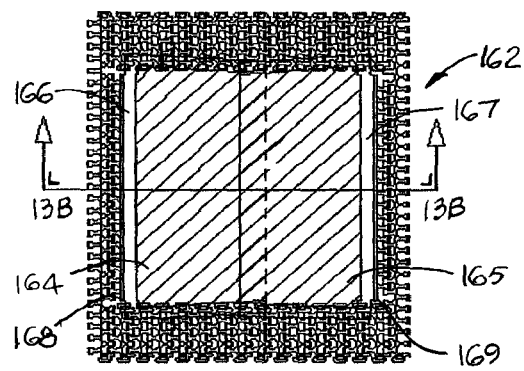
FIG. 13A is a top plan view of a two-door carrier section of a conveyor belt as in FIG. 2 with a deep pocket.
Figure 13B:
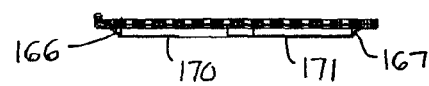
FIG. 13B is a cross section taken along lines 13B-13B of FIG. 13A.

FIGS. 13A and 13B show a two-door carrier section 162 in which the two closed doors 164, 165 have end walls 166, 167 that extend downward from hinge ends 168, 169 to bottom floors 170, 171 that form a deeper carrier pocket than the previously described doors provide. The deep-pocket carrier 162 is better able to trap larger or more unstable articles and is especially useful on inclines and declines.

Figure 14A:
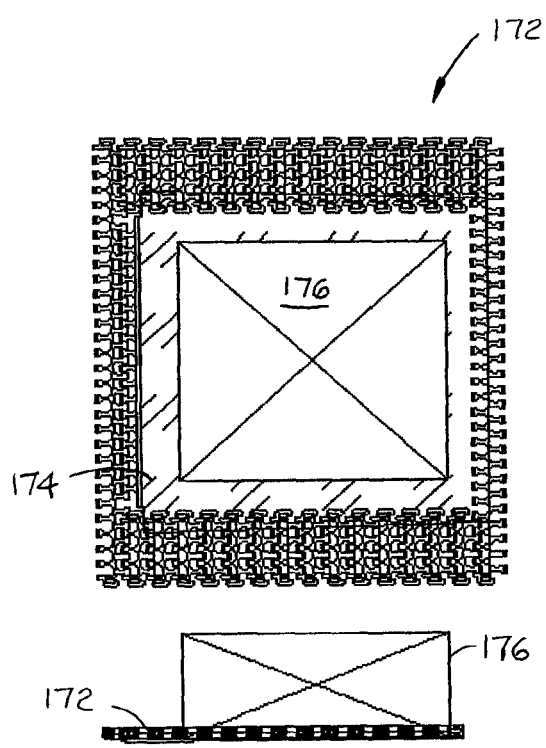
FIGS. 14A and 14B are top plan and side elevation views of a carrier section as in FIG. 3A with a transparent door.
Figure 14B:
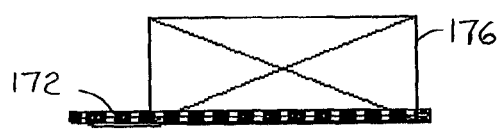

FIGS. 14A and 14B show a single-door carrier section 172 in which the door 174 is made of a transparent material, such as transparent plastic or glass, so that indicia on the bottom side of a box 176 can be read by an optical scanner. In that way all six sides of the box 176 can be scanned.

FIG. 15 shows a pair of doors 178, 179 for a two-door carrier. A crisscross pattern of reinforcing ribs 180 on the bottoms of the doors 178, 179 provides extra structure and strength.

FIGS. 16A-16C and FIGS. 17A-C depict a conveyor belt 181, 181' with two-door carriers as in FIG. 4A. In both versions the leading doors 182, 184 have projections 186, 188 that extend laterally outward from the bottoms of both sides. The projections 186 in FIGS. 16A-16C are tabs that are received in slotted guides 190 supported by the sides of the conveyor frame. The guides 190 run along the length of the conveyor. Shown in their positions relative to the belt 181 in FIG. 16A, the bottom surfaces of the guides 190 form guide surfaces defining the bottoms of the slots and support the tabs 186 as they slide in the slots in the direction of belt travel 46 and keep the doors 182, 183 closed. The projections 188 in FIGS. 17A-17C are cam followers with rollers 192 at distal ends. Like the tabs, the cam followers 188 are received in the guides 190, but ride along the slots in lower-friction rolling, rather than sliding, contact.

Figure 18A:
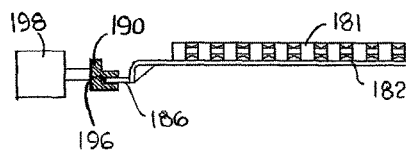
FIG. 18A is an enlarged view of one side of the sorter cross section of FIG. 16A.
Figure 18B:
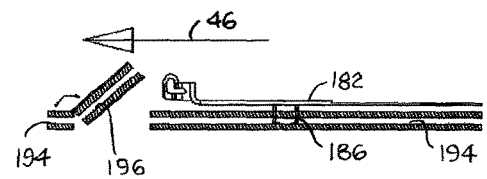
FIG. 18B is a side elevation view of one side of a length of the sorting conveyor showing a straight tab-receiving slot segment and a movable segment in an open position at a drop.
Figure 19A:
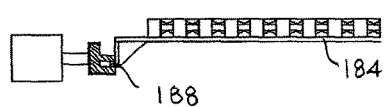
FIG. 19A is an enlarged view of one side of the sorter cross section of FIG. 17A.
Figure 19B:
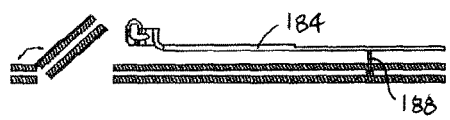
FIG. 19B is a side elevation view of one side of a length of the sorting conveyor showing a straight cam-roller-receiving slot segment and a movable segment in an open position at a drop.

FIGS. 18A and 18B show a guide 190 along one side of the conveyor for a belt 181 with a tab 186 as in FIG. 16A. The lower guide surface of the guide 190 on which the tab 186 rides has a stationary horizontal segment 194 interrupted by a movable segment 196 that is selectively movable by an actuator 198 at each drop. In this example the actuator 198 rotates the movable segment 196 of the guide 190 between a closed position (FIG. 18A) in which the movable segment is horizontal and continuous with the stationary segments 194 upstream and downstream in the direction of belt travel 46. With the movable segment in the closed position, the tab 186 of a carrier door keeps the carrier closed. When the actuator 198 rotates the movable segment 196 to an open position that is discontinuous with the adjacent stationary segments 194 of the guide 190 as shown in FIG. 18B, the tab 186 drops off the downstream end of the upstream stationary segment, which causes the door 182 to open and articles supported in the carrier to drop. The operation is identical for the doors 184 in the cam followers 188 in FIGS. 19A and 19B.

Figure 21A:
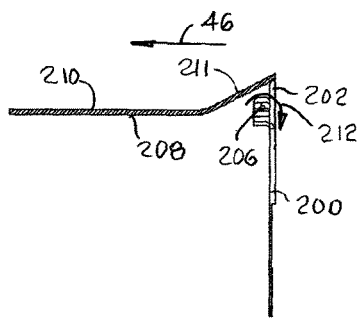
FIGS. 21A and 21B arc side elevation views of a closing mechanism pivoting the tab of the door of FIG. 20 from an open to a closed position.
Figure 20:
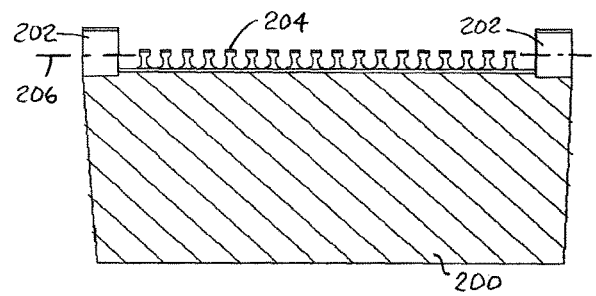
FIG. 20 is a front elevation view of a released door in a carrier as in FIG. 3A with tabs.
Figure 21B:
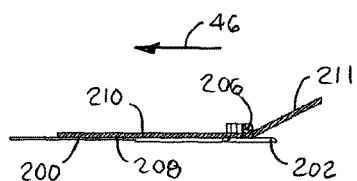

One mechanism for closing a door 200 as in FIG. 20 is shown in FIGS. 21A and 21B. The door 200 has projecting tabs 202 on each side at the hinge end 204. The tabs 202 extend outward of the hinge end 204 past the hinge axis 206. Supported in the conveyor frame on both sides are guide surfaces 208 that include a horizontal segment 210 and a sloped segment 211 that slopes downwardly in the direction of belt travel 46 to the horizontal segment. When the tab 202 of an open door 200 in a sorter belt advancing in the direction of belt travel 46 encounters the upstream sloped guide segment 211, the door is pivoted in the direction of the arrow 212 from the open position shown in FIG. 21A to the closed position shown in FIG. 21B in which the tab 202 encounters the horizontal segment 210.

Figure 22:
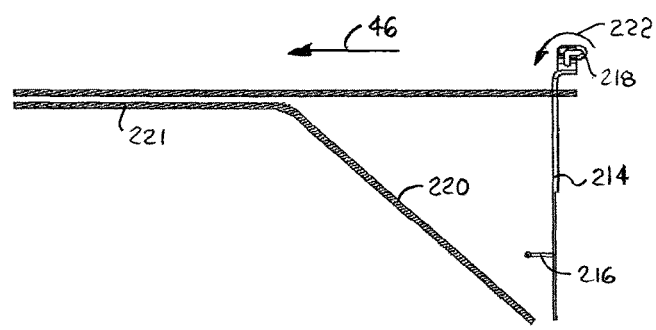
FIG. 22 is a side elevation view of a closing mechanism for use with a carrier section as in FIG. 19B.
Figure 23A:
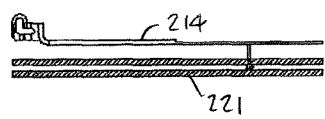
FIGS. 23A and 23B are enlarged side elevation and front elevation cross-sectional views of the conveyor length of FIG. 19B along the straight segment.
Figure 23B:
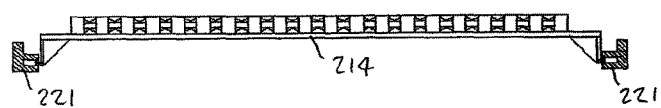
Figure 24A:
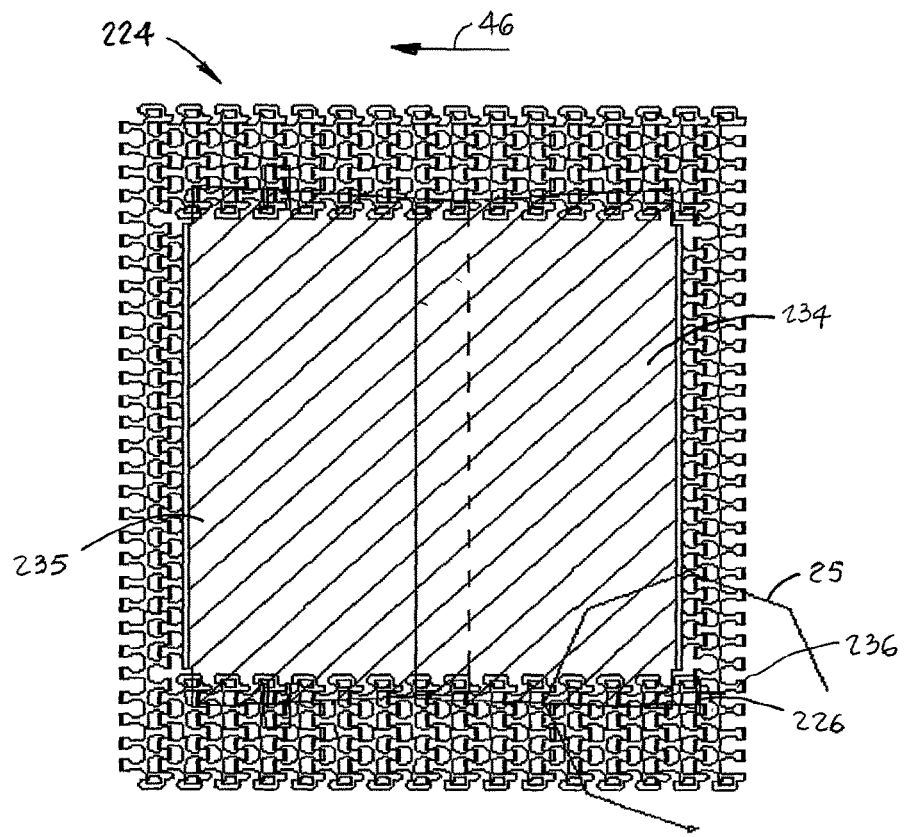
FIGS. 24A, 24B, and 24C are top plan, side elevation, and front elevation views of a two-door carrier segment as in FIG. 4A, but with a spring return.
Figure 24B:
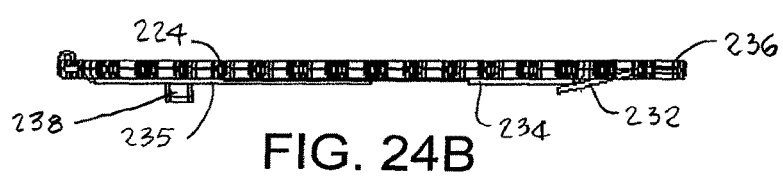
Figure 24C:
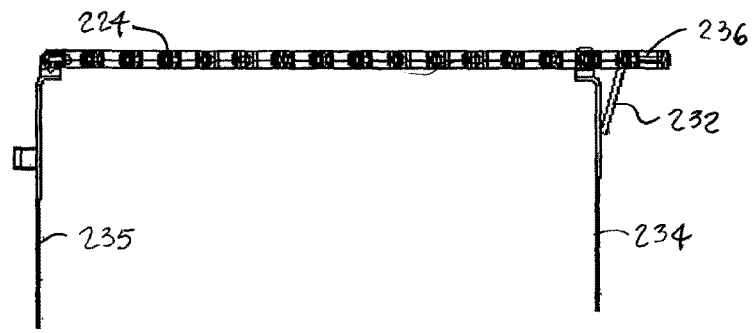
Figure 25:
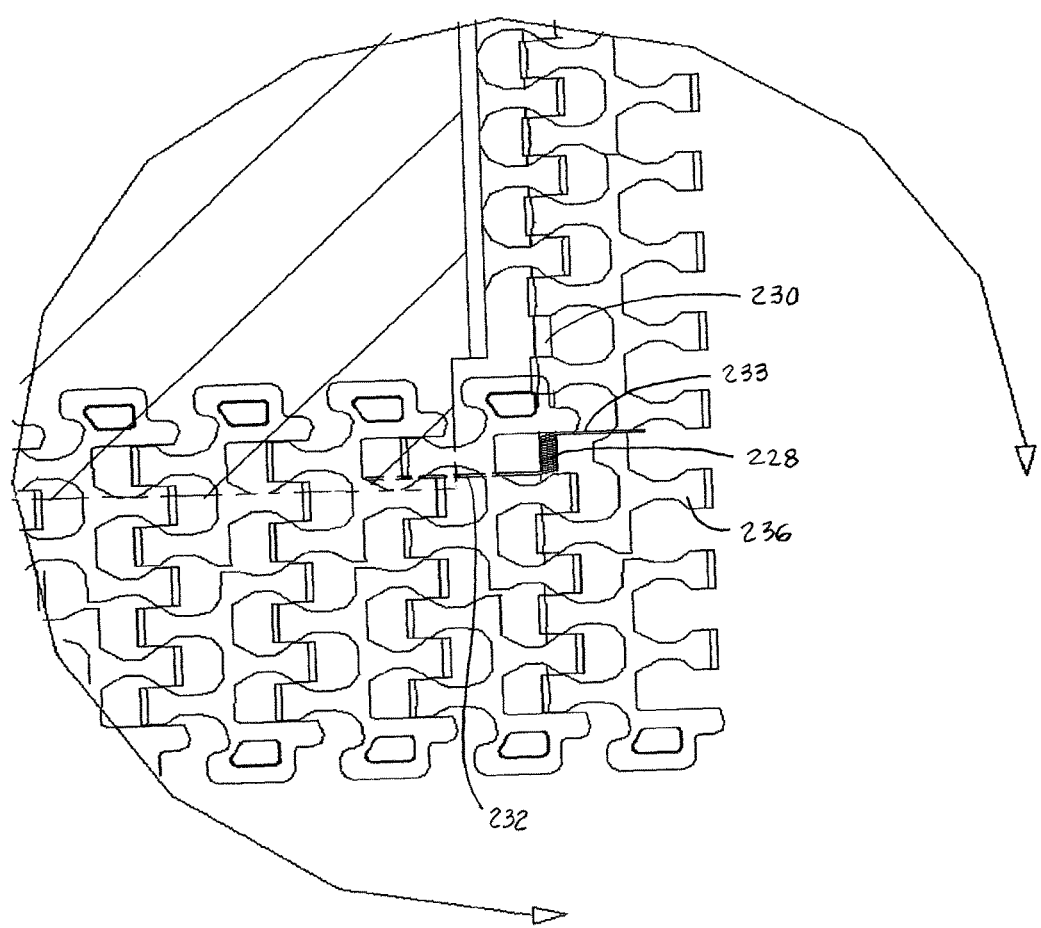
FIG. 25 is an enlarged view of the spring return of FIG. 24A.

FIG. 22 shows a closing mechanism for a carrier door 214 having a cam follower 216 on the distal-end side of the hinge axis 218. For this recloser, a sloped guide surface 220 sloped upwardly in the direction of belt travel 46 pivots the door about its hinge axis 218 in the direction of the arrow 222 as the cam follower 216 rolls up the slope. At the top of the slope, the door 214 is in its closed horizontal orientation as it advances in the direction of belt travel along the slotted stationary horizontal segment 221 of the guide, as shown in FIGS. 23A and 23B.

A spring-loaded two-door carrier section 224 is shown in FIGS. 24A-24C and 25. A torsion spring 226 has a coil section 228 encircling a hinge pin 230. Leading and trailing arms 232, 233 of the spring 226 extend outward from opposite ends of the coil section 228. In the version depicted in FIGS. 24B, 24C, and 25, the leading arm 232 of the spring 226 extends under the bottom of the carrier's trailing door 234, and the trailing arm 233 extends over the top of or is embedded in the belt body 236. In this arrangement the torsion spring 226 biases the trailing door 234 toward the closed position shown in FIG. 24B. When the closed carrier 224 reaches its drop destination, the leading door 235 in the direction of belt travel 46 is released by an opening mechanism operating on the door's tabs 238. The weight of the load forces the trailing door 234 open against the spring force, which allows the load to drop. Once the load has cleared the trailing door 234, the leading arm 234 of the spring 226 automatically recloses the door. The leading door is then closed by a closing mechanism, such as in FIG. 21A or FIG. 22. It would also be possible to arrange the torsion spring 226 to bias a door toward the open position by extending one arm of the spring along the top of the door and the opposite arm into or under the bottom of the belt body. The downward spring force on the door makes it open faster.

Figure 27A:
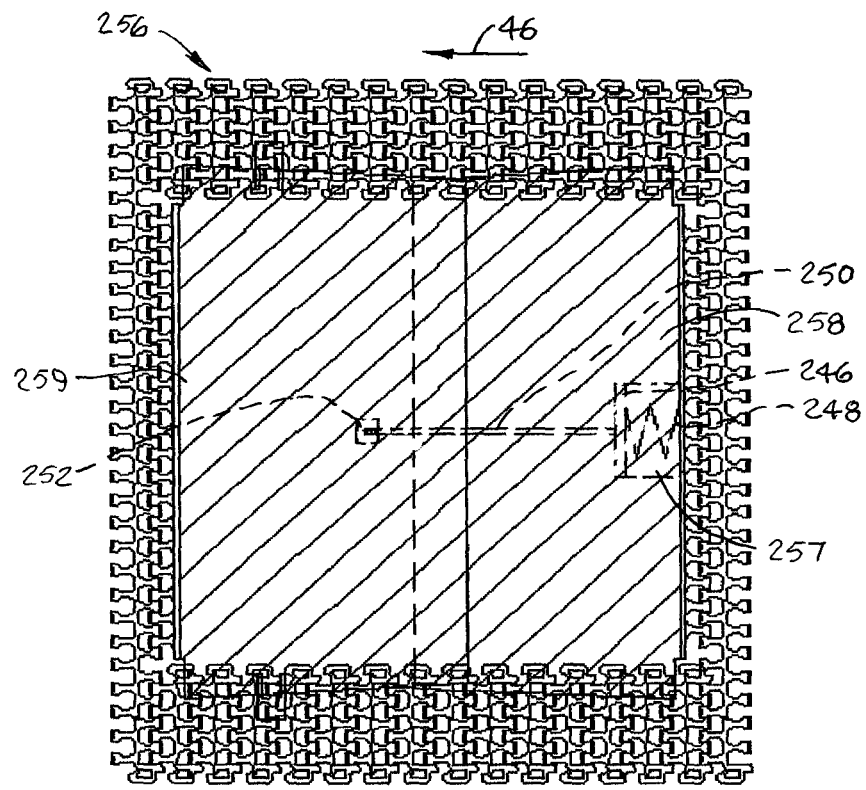
FIGS. 27A, 27B, and 27C are top plan, side elevation, and front elevation views of a two-door carrier section as in FIG. 5A with a spring-return latch.
Figure 27B:
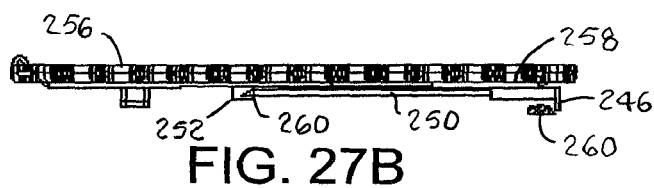
Figure 27C:
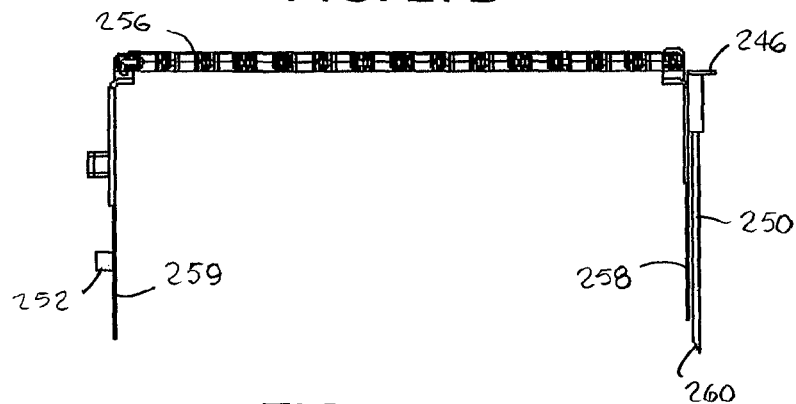

FIGS. 26A-26C show a two-door carrier section 238 with a spring-return latch 240 joining the two doors 242, 243 in the closed position shown in FIGS. 26A and 26B. The latch includes a housing 244 mounted at the hinge end of the lower overlapping door 242. A plate 246 in the housing 244 is loaded on one side by a spring 248. A pin, or rod 250, extends from the other side of the plate 246 into a keeper 252 mounted on the bottom of the upper overlapping door 243. An actuator 254 mounted in the conveyor frame at each drop selectively pushes the plate 246 against the spring 248 to withdraw the rod 250 from the keeper 252 and release the doors 242, 243 and drop the supported articles. In this version the doors 242, 243 pivot on hinge axes that are parallel to the direction of belt travel 46. FIGS. 27A-27C show a two-door carrier section 256 with a similar spring-return mechanism 257. But in this version the two doors 258, 259 pivot about hinge axes perpendicular to the direction of belt travel 46. An actuator 260 in the conveyor frame at each drop is selectively movable into a position intercepting the latch's plate 246, which is mounted to the bottom of the trailing door 258. As the belt advances in the direction of belt travel 46, the spring 248 is compressed by the retained plate 246, the rod 250 is drawn out of the keeper 252 on the other door 259, and the doors are opened. Upon closure the tip 260 of the rod 250, which may be tapered, rides along the front edge of the keeper 252, compressing the spring 248 until the rod slips into the keeper, relaxing the spring and latching the doors 258, 259 together in the closed position.

Figure 28A:
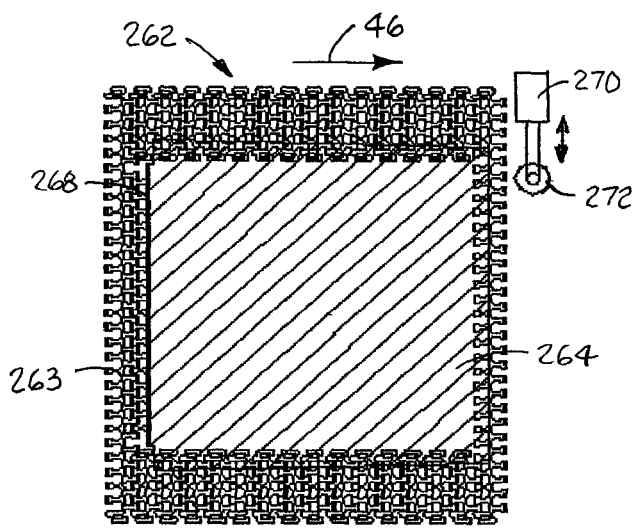
FIGS. 28A, 28B, and 28C are top plan, side elevation, and front elevation views of a single-door carrier section as in FIG. 3A, but with a flange depending from a free end of the door.
Figure 28B:
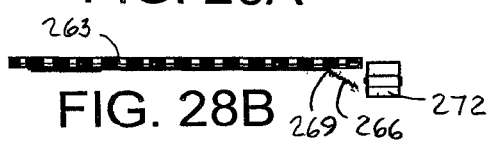
Figure 28C:
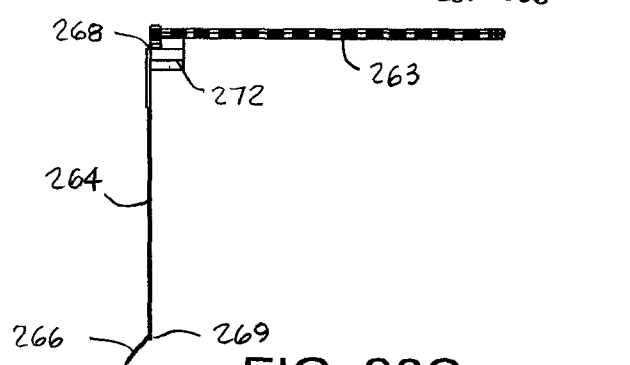
Figure 29A:
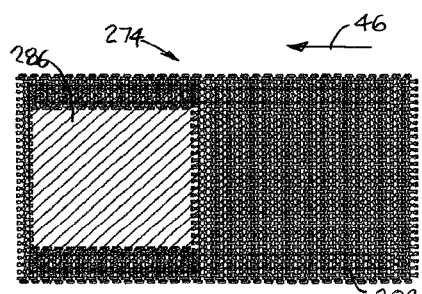
FIGS. 29A, 29B, and 29C are top plan, side elevation, and front elevation views of another version of a carrier section for a sorter as in FIG. 1 with a sliding door shown in the closed position.
Figure 29B:
Figure 29C:
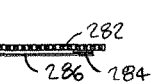
Figure 29D:
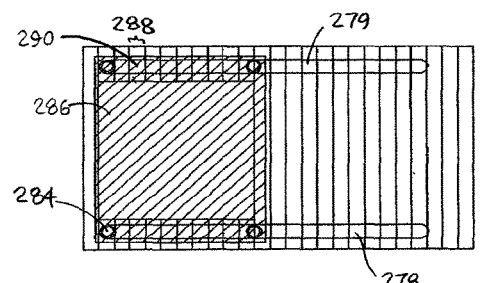
FIG. 29D is a simplified schematic of the top plan view of FIG. 29A.

FIGS. 28A-28C show a single-door carrier section 262 with a flanged door 264. The door 264 is attached to the belt body 263 at a hinge end 268. A flange 266 extends obliquely downward from a distal end 269 of the closed door 264. The hinge end 268 of the door 264 trails the distal end 269 in the direction of belt travel 46 when the door is closed. An actuator 270 mounted in the conveyor frame at each drop includes a bumper 272 that is selectively extendable to a position intercepting the angled flange 266. The bumper 272 rides up the angled face of the flange 266 and slides along the top surface of the door 264 to wedge it open as the belt advances in the direction of belt travel 46. Once the door 264 is fully open, the actuator 270 retracts the bumper 272.

Figure 30A:
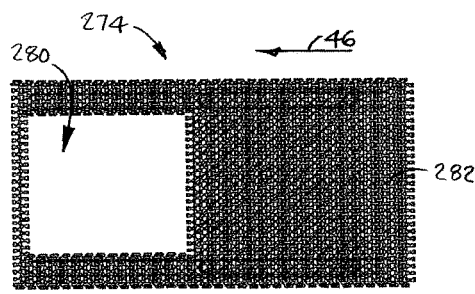
FIGS. 30A and 30B are top plan and side elevation views of the carrier section of FIG. 29A with the door in an open position.
Figure 30B:
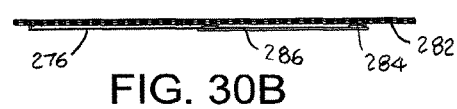
Figure 30C:
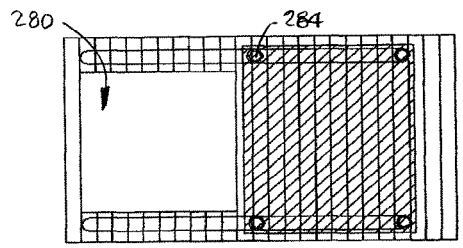
FIG. 30C is a simplified schematic of the top plan view of FIG. 30A.

A sliding-door carrier section 274 is shown in the closed position in FIGS. 29A-29D and in the open position in FIGS. 30A-30C. A slide track 276 having two track guides 278, 279 flanking the carrier opening 280 is formed in the bottom of the belt body 282. Bosses 284 at the corners of a door 286 are slidingly received in the track guides 278, 279 of the slide track 276. The track 276 extends opposite the direction of belt travel 46 a distance far enough for the sliding door 286 to clear the opening 280 enough for an article to drop through. The slide track 276 is segmented, with each belt row 288 having a pair of track guide segments 290 formed on its bottom surface. The segmented slide track 276 allows the conveyor belt to flex sidewise to negotiate turns and to articulate up and down to transition onto and off inclines and declines.

Figure 31A:
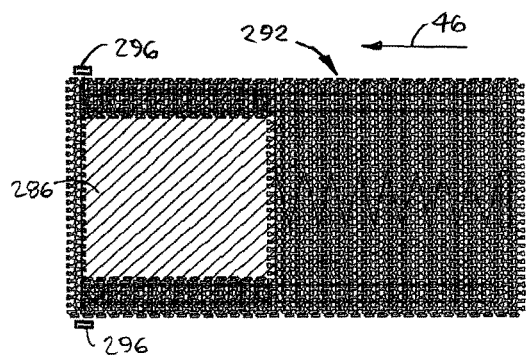
FIG. 31A is a top plan view of a closed sliding-door carrier section as in FIG. 29A with a magnetic opener and a spring return.
Figure 31B:
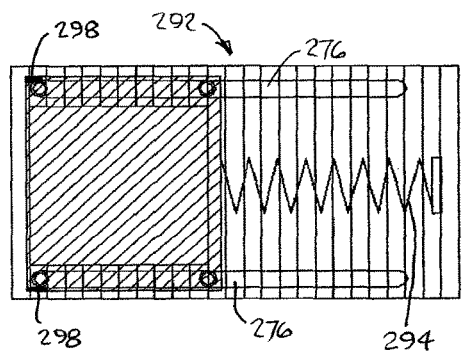
FIG. 31B is a simplified schematic of the top plan view of FIG. 31A.
Figure 31C:
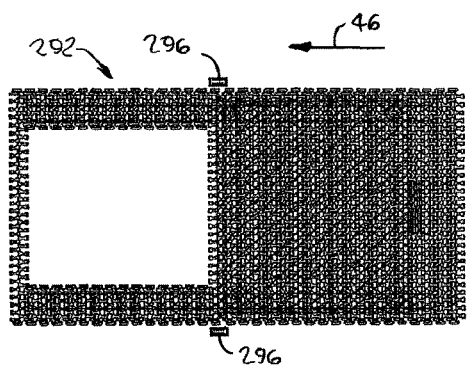
FIG. 31C is a top plan view of the sliding-door carrier section of FIG. 31A with the door open.
Figure 31D:
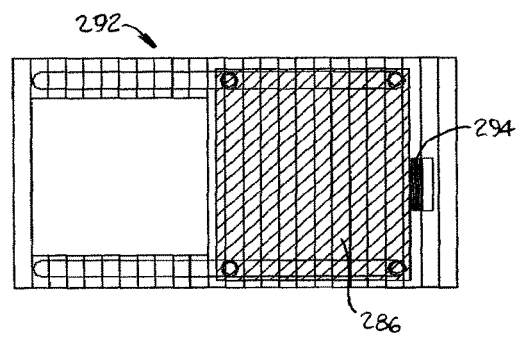
FIG. 31D is a simplified schematic of the top plan view of FIG. 31C.
Figure 32A:
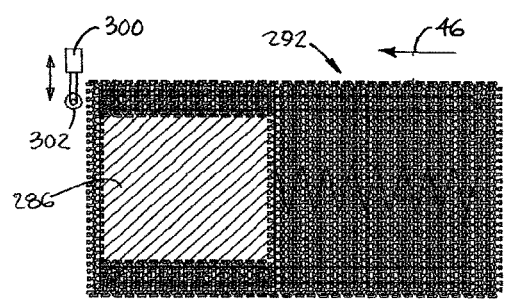
FIG. 32A is a top plan view of a closed sliding-door carrier section as in FIG. 29A with a bumper opener and a spring return.
Figure 32B:
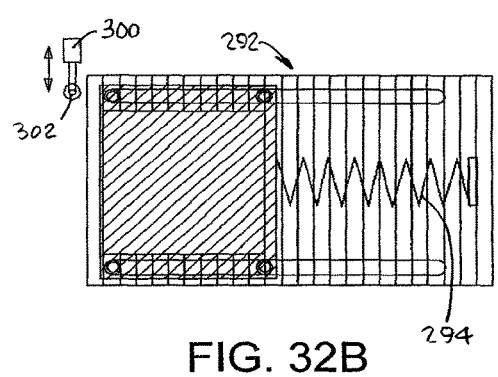
FIG. 32B is a simplified schematic of the top plan view of FIG. 32A.
Figure 32C:
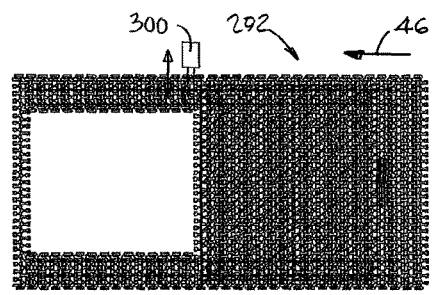
FIG. 32C is a top plan view of the sliding-door carrier section of FIG. 32A with the door open.
Figure 32D:
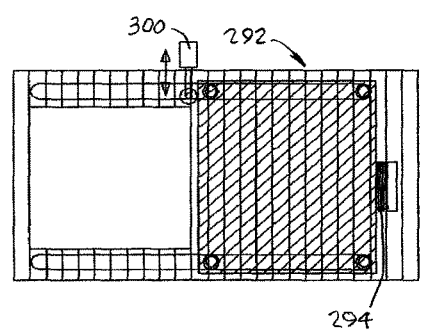
FIG. 32D is a simplified schematic of the top plan view of FIG. 32A.

FIGS. 31A and 31B show a sliding-door carrier section 292 as in FIGS. 29A-29D, but with a spring-loaded closing mechanism 294. The conveyor also includes a magnetic opening mechanism 296 mounted in the conveyor frame at each drop. The magnetic opening mechanism 296 shown comprises a pair of electromagnets on opposite sides of the sorting conveyor at each drop. The door 286 has a ferromagnetic element 298 at both sides of the leading end of the door. When the electromagnets 296 are selectively actuated, they attract the ferromagnetic elements 298 and hold the front end of the door at the position of the electromagnets as the belt advances past in the direction of belt travel 46. The door 286 slides along the advancing slide track 276 and compresses the spring 294. After the door 286 has fully retracted and the articles dropped, the electromagnets are deactuated, and the compressed spring 294 pushes the door 286 in the direction of belt travel to the closed position. Instead of an electromagnetic actuator, a permanent magnet selectively moved toward and away from the belt by a linear or rotary actuator could be used to open the door.

FIGS. 32A-32D show the carrier section 292 of FIGS. 31A-31D opened by a mechanical opener 300. The actuator 300 includes a bumper 302 that is moved between an extended position obstructing the leading end of the door 286 and preventing it from advancing in the direction of belt travel 46 with the belt. Once the door 286 is fully open, the actuator 300 retracts the bumper 302, which allows the spring 294 to release and close the door.

Figure 33B:
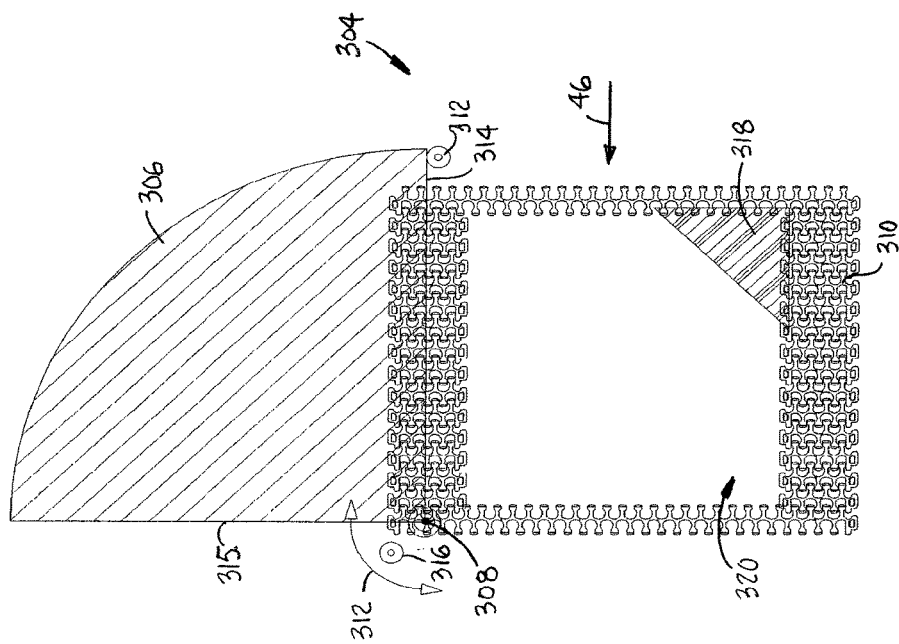
FIGS. 33A and 33B are top plan views of another single-door carrier section for use in a sorter as in FIG. 1 with a horizontally pivoting door shown in closed and open positions.
Figure 33A:
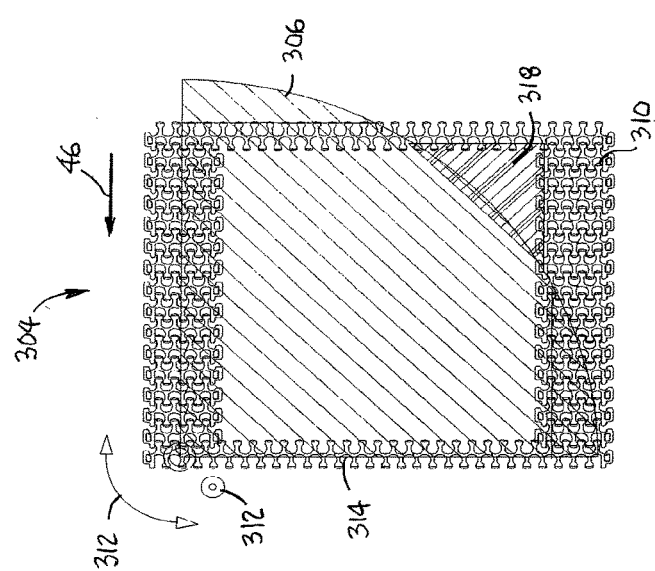

FIGS. 33A and 33B show a carrier section 304 with a sector-shaped door 306 that pivots about a pivot axis 308 perpendicular to the plane of the belt body 310 as indicated by the arrow 312. The sector shape shown is a quarter of a circle. A bumper 312 at each drop is actuated between two positions by an actuator. In FIG. 33A the bumper 312 is positioned inward of the pivot axis 312 to contact the leading edge 314 of the closed door 306 as the belt advances in the direction of belt travel 46. Contact with the bumper stop 312 rotates the door 306 counterclockwise in FIG. 33A until it is fully open as in FIG. 33B. The actuator can then retract the bumper 312 to allow subsequent carriers not meant to open to pass by. A stationary bumper 316 at a downstream position can be used to close the door 306 by contacting the leading edge 315 of the open door at a point outward of the pivot axis 308 to pivot the door clockwise back to its closed position as the belt advances past. A gusset 318 in the corner of the carrier opening 320 closes the gap between the circular-sector-shaped door 306 and the rectangular opening 320.

Figure 34:
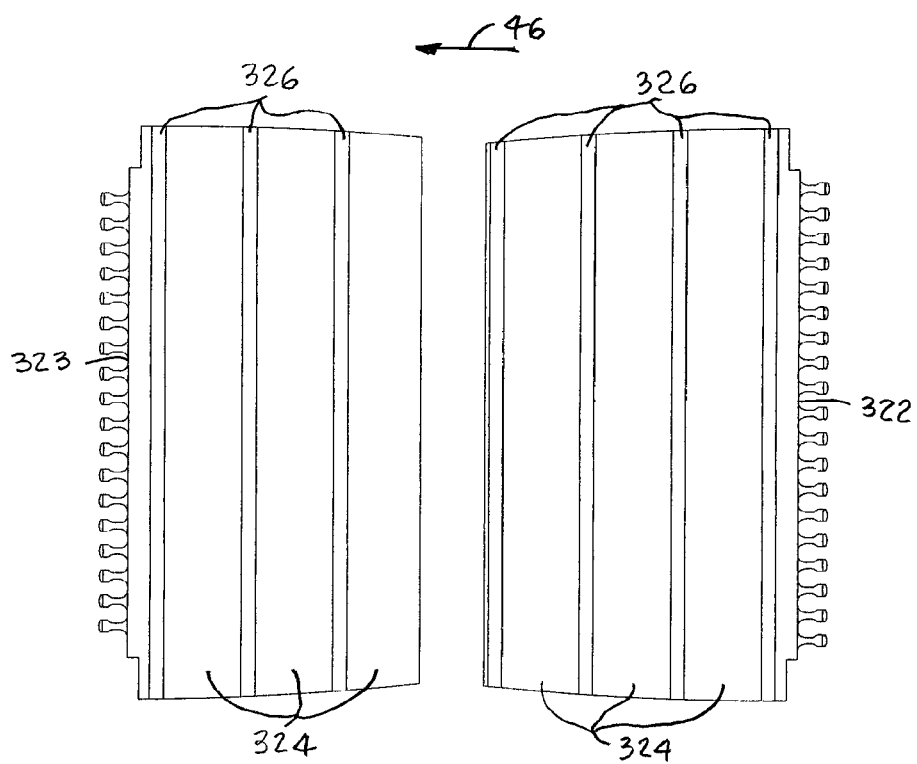
FIG. 34 is a top plan view of a pair of pleated doors for a two-door carrier section in a sorter belt as in FIG. 2.
Figure 36:
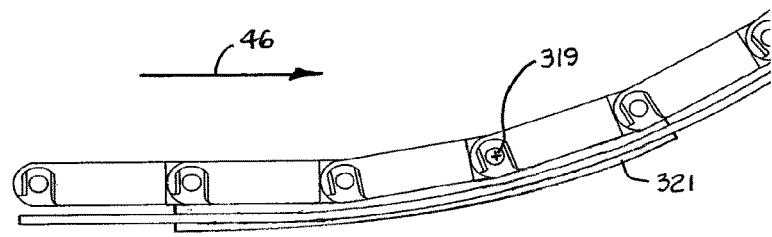
FIG. 36 is a side elevation view of a portion of a conveyor belt as in FIG. 2 entering an incline.

For flat conveyor configurations, such as the racetrack of FIG. 1, the carrier doors can be made of a rigid material, such as polypropylene, acetal, polycarbonate, other rigid polymers, plexiglass, fiberglass, or metal. But in incline—decline conveyor configurations as in FIG. 36, the door 321 has to be able to flex about a horizontal axis 319 perpendicular to the direction of belt travel 46. FIG. 34 shows a pair of carrier doors 322, 323 that consist of rigid sections 324 joined by flexible sections 326 that extend across the door perpendicular to the direction of belt travel 46. The flexible sections can be made of a more pliable material, such as a urethane or an elastomer, molded or otherwise bonded to the rigid sections. In this way the doors 322, 323 can bend with the articulating belt rows as the belt enters or exits an incline or a decline without too great a loss of the stiffness required to support required product loads. Alternatively the flexible sections 326 can be pleated to allow the doors 322, 323 to flex. The pleats could also be used with the sliding doors of FIG. 29A to allow them to flex sidewise with the segmented slide tracks in a left or right turn.

What is claimed is:

1. A conveyor belt comprising:
    an endless belt body having a top and an opposite bottom extending laterally from a first side to a second side and longitudinally in a direction of belt travel;
    wherein the belt body includes a plurality of openings extending through the belt body from the top to the bottom and indented laterally inward of the first and second sides and spaced apart longitudinally;
    a plurality of doors associated with the plurality of openings and movably attached to the belt body for movement from first positions occluding the openings to support articles in the openings to second positions away from the openings to release articles through the openings.

2. A conveyor belt as in claim 1 wherein each of the openings has a first door and a second door and the second door is supported by the first door in the first position and is unsupported by the first door in the second position.

3. A conveyor belt as in claim 1 wherein each of the openings has a first door and a second door and the first door has a free end and an opposite hinge end hingedly connected along a first hinge axis to the belt body proximate the opening and wherein the second door has a free end and an opposite hinge end hingedly connected along a second hinge axis to the belt body proximate the opening across from the first door.

4. A conveyor belt as in claim 1 wherein the doors pivot between the first positions and the second positions about longitudinal axes or about lateral axes.

5. A conveyor belt as in claim 1 wherein the doors pivot between the first positions and the second positions about axes perpendicular to the plane of the belt body.

6. A conveyor belt as in claim 1 wherein the doors slide laterally or longitudinally between the first positions and the second positions.

7. A conveyor belt as in claim 6 comprising slide tracks suspended from the bottom of the belt body on which the doors slide.

8. A conveyor belt as in claim 1 further comprising springs biasing the doors toward the first positions or toward the second positions.

9. A conveyor belt as in claim 1 wherein the doors in the first positions sit below the bottom of the belt body to support articles in the openings.

10. A conveyor belt as in claim 1 wherein the doors are transparent.

11. A conveyor belt as in claim 1 further comprising laterally or longitudinally extending flights standing up from the top of the belt body between openings.

12. A conveyor belt as in claim 11 wherein the flights have faces oblique to the top of the belt body.

13. A conveyor belt as in claim 1 wherein the doors have flights that extend upward through the openings and past the top of the belt body when the doors are in the first position.

14. A conveyor belt as in claim 1 wherein the belt body comprises a series of rows of belt modules linked together at lateral joints formed by interdigitated fingers of consecutive rows.

15. A conveyor belt as in claim 14 further comprising fingers extending from rows bounding the openings into the openings and wherein at least some of the fingers bounding the openings support hinge rods pivotally attaching the doors to the belt body.

16. A conveyor comprising:
    a conveyor frame;
    an endless conveyor belt supported in the frame;
    a drive system driving the conveyor belt in a direction of belt travel;
    wherein the conveyor belt includes:
        an endless belt body having a top and an opposite bottom extending laterally from a first side to a second side and longitudinally in a direction of belt travel;
        wherein the belt body includes a plurality of openings extending through the belt body from the top to the bottom and indented laterally inward of the first and second sides and spaced apart longitudinally;
        a plurality of doors associated with the plurality of openings and movably attached to the belt body for movement from first positions occluding the openings to support articles in the openings to second positions away from the openings to release articles through the openings.

17. A conveyor as in claim 16 wherein the conveyor belt is arranged in an oval configuration and the drive system comprises at last one intermediate drive belt engaging the first side of the belt body along a straight portion of the oval configuration.

18. A conveyor as in claim 16 further comprising sideguards supported by the conveyor frame and extending over the top of the belt body at the first and second sides, wherein the sideguards have an upper surface angled downward toward the center of the conveyor belt.

19. A conveyor as in claim 16 further comprising a guide surface extending along the conveyor frame and wherein at least one of the doors at each opening includes a projection extending outward to ride along the guide surface and support the at least one of the doors in the closed first position as the conveyor belt is driven in the direction of belt travel.

20. A conveyor as in claim 19 wherein the guide surface includes horizontal segments and at least one sloped segment for guiding the projections back to the horizontal segments to close the doors.

21. A conveyor as in claim 19 wherein the projection is a laterally extending tab and the guide surface defines the bottom of a slot receiving the tab.

22. A conveyor as in claim 19 wherein the projection is a laterally extending cam follower having a cam roller at a distal end and the guide surface defines a cam surface at the bottom of a slot receiving the roller.

23. A conveyor as in claim 19 further comprising a plurality of actuators and wherein the guide surface includes stationary segments interrupted by movable segments selectively movable by the actuators from closed positions continuous with adjacent stationary segments to open positions discontinuous with adjacent stationary segments to allow the projections to drop from the guide surface and the doors to open in the second positions.

24. A conveyor as in claim 16 comprising a first door and a second door at each of the openings wherein the first door has a free end and an opposite hinge end hingedly connected along a first hinge axis to the belt body proximate the opening and wherein the second door has a free end and an opposite hinge end hingedly connected along a second hinge axis to the belt body proximate the opening across from the first door.

25. A conveyor as in claim 24 wherein the first and second hinge axes are both parallel to the direction of belt travel or are both perpendicular to the direction of belt travel.

26. A conveyor as in claim 24 further comprising:
a spring return latch releasably joining the first and second doors in the closed first position at each opening; and
a plurality of actuators disposed along the length of the conveyor to selectively release the spring return latches and open the first and second doors.

27. A conveyor as in claim 16 further comprising a plurality of bumpers disposed along the length of the conveyor and wherein each of the doors includes:
a free end and an opposite hinge end hingedly connected along a hinge axis to the belt body proximate one of the openings wherein the hinge end trails the free end in the direction of belt travel; and
a flange angled downward from the free end in the direction of belt travel;
wherein the bumpers are selectively movable from non-interfering positions with the conveyor belt to interfering positions in which the bumpers intercept the flange and ride up the flange and along the door to pivot the door to the open second position.

28. A conveyor as in claim 16 further comprising slide tracks suspended from the bottom of the belt body on which the doors slide between the first positions and the second positions.

29. A conveyor as in claim 28 further comprising:
ferromagnetic elements attached to the doors;
springs biasing the doors toward the closed first positions;
a plurality of electromagnets disposed along the length of the conveyor selectively actuated to attract the ferromagnetic elements and hold the doors in place as the doors slide along the slide tracks toward the open second positions and compress the springs as the conveyor belt advances in the direction of belt travel.

30. A conveyor as in claim 28 further comprising springs biasing the doors toward the closed first positions and a plurality of bumpers disposed along the length of the conveyor wherein the bumpers are selectively movable from non-interfering positions with the conveyor belt to interfering positions in which the bumpers intercept the doors and hold the doors in place as the doors slide along the slide tracks to the open second positions and compress the springs as the conveyor belt advances in the direction of belt travel.

31. A conveyor as in claim 16 further comprising a plurality of bumpers disposed along the length of the conveyor and wherein the doors are sector shaped each with a first radial edge and a second radial edge and pivot between the first positions and the second positions about axes perpendicular to the plane of the belt body and wherein the bumpers are selectively movable between (a) opening positions in which the bumpers contact the first radial edges of the doors in the closed first positions to pivot the doors to the open second positions and (b) closing positions in which the bumpers contact the second radial edges of the doors in the open first positions to pivot the doors to the closed first positions.

32. A conveyor as in claim 16 wherein the endless belt body comprises a series of rows of belt modules linked together end to end at lateral joints formed by interdigitated fingers of consecutive rows to allow the conveyor belt to articulate at the lateral joints when entering or exiting an inline or a decline.

33. A conveyor as in claim 32 wherein the fingers along one end of each row of belt modules are elongated in the direction of belt travel to allow the conveyor belt to negotiate left or right turns.

34. A conveyor as in claim 32 wherein the longitudinal extent of the openings exceeds the pitch of the conveyor belt.

* * * * *